(12) United States Patent
Phelps et al.

(10) Patent No.: US 12,530,426 B2
(45) Date of Patent: *Jan. 20, 2026

(54) LOW LATENCY MATRIX MULTIPLY UNIT

(71) Applicant: Google LLC, Mountain View, CA (US)

(72) Inventors: Andrew Everett Phelps, Middleton, WI (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,469

(22) Filed: Apr. 17, 2024

(65) Prior Publication Data

US 2024/0362298 A1 Oct. 31, 2024

Related U.S. Application Data

(63) Continuation of application No. 17/985,069, filed on Nov. 10, 2022, now Pat. No. 11,989,259, which is a
(Continued)

(51) Int. Cl.
*G06F 17/16* (2006.01)
*G06F 5/01* (2006.01)
(Continued)

(52) U.S. Cl.
CPC ............. *G06F 17/16* (2013.01); *G06F 5/015* (2013.01); *G06F 9/30036* (2013.01);
(Continued)

(58) Field of Classification Search
CPC ...... G06F 17/16; G06F 5/015; G06F 9/30101; G06F 15/8046; G06F 9/30032;
(Continued)

(56) References Cited

U.S. PATENT DOCUMENTS

| 4,720,780 A | 1/1988 | Dolecek |
| 5,471,627 A | 11/1995 | Means et al. |
| (Continued) | | |

FOREIGN PATENT DOCUMENTS

| CN | 1774709 | 5/2006 |
| CN | 101968732 | 2/2011 |
| (Continued) | | |

OTHER PUBLICATIONS

Yu-Hsin Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), Seoul, Korea (South), 2016, pp. 367-379. (Year: 2016).*

(Continued)

*Primary Examiner* — Andrew Caldwell
(74) *Attorney, Agent, or Firm* — Fish & Richardson P.C.

(57) ABSTRACT

Methods, systems, and apparatus for a matrix multiply unit implemented as a systolic array of cells are disclosed. The matrix multiply unit may include cells arranged in columns of the systolic array. Two chains of weight shift registers per column of the systolic array are in the matrix multiply unit. Each weight shift register is connected to only one chain and each cell is connected to only one weight shift register. A weight matrix register per cell is configured to store a weight input received from a weight shift register. A multiply unit is coupled to the weight matrix register and configured to multiply the weight input of the weight matrix register with a vector data input in order to obtain a multiplication result.

29 Claims, 10 Drawing Sheets

Related U.S. Application Data continuation of application No. 16/830,894, filed on Mar. 26, 2020, now Pat. No. 11,500,961, which is a continuation of application No. 15/983,043, filed on May 17, 2018, now Pat. No. 10,635,740.

(60) Provisional application No. 62/507,766, filed on May 17, 2017.

(51) Int. Cl.
  *G06F 9/30* (2018.01)
  *G06F 15/80* (2006.01)
  *G06N 3/04* (2023.01)
  *G06N 3/08* (2023.01)

(52) U.S. Cl.
  CPC ...... *G06F 9/30101* (2013.01); *G06F 15/8046* (2013.01); *G06F 9/30032* (2013.01); *G06N 3/04* (2013.01); *G06N 3/08* (2013.01)

(58) Field of Classification Search
  CPC .... G06F 7/5443; G06F 9/30036; G06F 7/523; G06F 7/483; G06F 2207/3892; G06N 3/04; G06N 3/08; G06N 3/063
  USPC .......................................................... 708/522
  See application file for complete search history.

(56) References Cited

U.S. PATENT DOCUMENTS

| | | | |
|---|---|---|---|
| 6,023,742 A * | 2/2000 | Ebeling | G06F 9/30036 |
| | | | 712/15 |
| 7,161,995 B1 | 1/2007 | Mazahreh et al. | |
| 8,543,634 B1 | 9/2013 | Xu et al. | |
| 8,620,984 B2 | 12/2013 | Mazahreh et al. | |
| 9,747,546 B2 | 8/2017 | Ross et al. | |
| 10,698,974 B2 | 6/2020 | Phelps et al. | |
| 10,698,976 B2 | 6/2020 | Phelps et al. | |
| 11,599,601 B2 | 3/2023 | Phelps et al. | |
| 2004/0122887 A1 | 6/2004 | Macy | |
| 2011/0040821 A1 | 2/2011 | Eichenberger et al. | |
| 2011/0125819 A1 | 5/2011 | Mazahreh et al. | |
| 2014/0289445 A1 | 9/2014 | Savich | |
| 2016/0342892 A1 | 11/2016 | Ross | |
| 2016/0342893 A1 | 11/2016 | Ross et al. | |
| 2017/0103314 A1* | 4/2017 | Ross | G06F 15/8046 |
| 2017/0103316 A1 | 4/2017 | Ross et al. | |
| 2018/0336163 A1 | 11/2018 | Phelps et al. | |
| 2018/0336164 A1 | 11/2018 | Phelps et al. | |
| 2019/0311243 A1 | 10/2019 | Whatmough et al. | |
| 2019/0354571 A1 | 11/2019 | Phelps et al. | |
| 2025/0232001 A1 | 7/2025 | Phelps et al. | |

FOREIGN PATENT DOCUMENTS

| | | |
|---|---|---|
| CN | 103975302 | 8/2014 |
| CN | 105117372 | 12/2015 |
| CN | 103246773 | 12/2016 |
| JP | H03-131965 | 6/1991 |
| JP | 2013-511891 | 4/2013 |
| JP | 2017-021483 A | 1/2017 |
| JP | 2018-521374 | 8/2018 |
| KR | 10-2017-0007151 | 1/2017 |
| TW | 201525856 | 7/2015 |
| TW | 201706871 | 2/2017 |
| TW | 201706873 | 2/2017 |
| WO | WO 2016186810 | 11/2016 |

OTHER PUBLICATIONS

Extended European Search Report in European Appln. No. 20198533.0, mailed on Mar. 5, 2021, 7 pages.
International Preliminary Report on Patentability in International Appln. No. PCT/US2018/033261, mailed on Nov. 19, 2019, 8 pages.
International Preliminary Report on Patentability in International Appln. No. PCT/US2018/033270, mailed on Nov. 19, 2019, 7 pages.
International Search Report and Written Opinion in International Appln. No. PCT/US2018/033261, mailed on Oct. 15, 2018, 15 pages.
International Search Report and Written Opinion in International Appln. No. PCT/US2018/033270, mailed on Oct. 15, 2018, 14 pages.
Kato et al., "Highly Parallel Neurocomputer," Fujitsu Limited, May 1991, pp. 213-222.
Khan et al., "Two-dimensional multirate systolic array design for artificial neural networks," First Great Lakes Symposium on Kalamazoo, Mar. 1, 1991, 8 pages.
Office Action in Chinese Appln. No. 201880004328.7, mailed on Nov. 11, 2022, 13 pages (with English translation).
Office Action in Chinese Appln. No. 201880004576.1, mailed on Nov. 11, 2022, 12 pages (with English translation).
Office Action in Indian Appln. No. 201947035951, mailed on Jun. 12, 2021, 6 pages (with English translation).
Office Action in Japanese Appln. No. 2019-553237, mailed on Dec. 1, 2020, 7 pages (with English translation).
Office Action in Japanese Appln. No. 2022-138332, mailed on Jul. 25, 2023, 6 pages (with English translation).
Office Action in Korean Appln. No. 10-2019-7026961, mailed on Jan. 21, 2021, 9 pages (with English translation).
Office Action in Korean Appln. No. 10-2019-7026961, mailed on Jul. 21, 2020, 8 pages (with English translation).
Office Action in Taiwanese Appln. No. 107116872, mailed on Apr. 23, 2019, 6 pages (with English translation).
Office Action in Taiwanese Appln. No. 109105071, mailed on Nov. 30, 2020, 7 pages (with English translation).
Office Action in Taiwanese Appln. No. 110130201, mailed on Sep. 30, 2021, 13 pages (with English translation).
Office Action in Taiwanese Appln. No. 111127382, mailed on Aug. 30, 2022, 11 pages (with English translation).
Ramacher, "Synapse—A Neurocomputer that Synthesized Neural Algorithms on a Parallel Systolic Engine," Journal of Parallel and Distributed Computing, Mar. 1, 1992, 13 pages.
Search Report in European Appln. No. 20188875.7, mailed on Nov. 27, 2020, 8 pages.
Office Action in Brazilian Appln. No. 1120190229167, mailed on May 12, 2025, 9 pages (with machine translation).
Notice of Allowance in Japanese Appln. No. 2024-024596, mailed on Apr. 1, 2025, 5 pages (with English translation).

* cited by examiner

LOW LATENCY MATRIX MULTIPLY UNIT

CROSS-REFERENCE TO RELATED APPLICATIONS

This application is a continuation of and claims priority to U.S. application Ser. No. 17/985,069, filed on Nov. 10, 2022 (now U.S. Pat. No. 11,989,259), which is a continuation of U.S. application Ser. No. 16/830,894, filed on Mar. 26, 2020 (now U.S. Pat. No. 11,500,961), which is a continuation of U.S. application Ser. No. 15/983,043, filed on May 17, 2018 (now U.S. Pat. No. 10,635,740), which claims the benefit of the filing date of U.S. Provisional Application No. 62/507,766, filed on May 17, 2017. The disclosures of the prior applications are considered part of and are incorporated by reference in the disclosure of this application.

BACKGROUND

This specification relates to performing neural network computation in hardware.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

This specification describes technologies relating to special-purpose hardware circuits that train neural networks, compute neural network inferences, or both, and specifically to special-purpose hardware circuits that decrease latency across a matrix multiply unit by increasing the rate in which weight values are loaded into weight matrix registers within the matrix multiply unit.

A systolic array is wired to perform matrix multiplies and typically has a uniform structure throughout the array. A matrix multiply unit of a systolic array is composed of multiply-add sub-units, each of which take an input operand, multiply the operand by a stored weight to obtain a result, and add the result to a partial sum to produce a new partial sum.

One way to lower the latency is to increase the rate of loading weights into multiply-add units.

In general, one innovative aspect of the subject matter described in this specification can be embodied in a special purpose hardware circuit that trains neural networks, computes neural network inferences, or both.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

A matrix multiply unit may be implemented as a systolic array of cells. Each cell of the array of cells may include a weight matrix register configured to receive a weight input from either a transposed or a non-transposed weight shift register; a transposed weight shift register configured to receive a weight input form a horizontal direction to be stored in the weight matrix register; a non-transposed weight shift register configured to receive a weight input from a vertical direction to be stored in the weight matrix register; and a multiply unit that is coupled to the weight matrix register and configured to multiply the weight input of the weight matrix register with a vector data input in order to obtain a multiplication result. Each cell may include a multiplexer configured to select between the weight input of the transposed weight shift register and the non-transposed weight shift register and forward the selected weight input to the weight matrix register.

The matrix multiply unit may include a first weight holding register configured to hold a weight value from either the transposed weight shift register or the non-transposed weight shift register.

The matrix multiply unit may include a second weight holding register configured to hold a weight value from either the transposed weight shift register or the non-transposed weight shift register.

Weight values may be loaded into the matrix multiply unit from a transposed weight shift register in a horizontal direction into the first weight holding register and from a non-transposed weight shift register in a vertical direction into the second weight holding register.

The weight matrix register may be loaded with a value from either the first or the second weight holding register.

In another embodiment, a matrix multiply unit implemented as a systolic array may include a plurality of cells arranged in columns of the systolic array; two chains of weight shift registers per column of the systolic array; a weight matrix register per cell configured to store a weight input received from a weight shift register; and a multiply unit that is coupled to the weight matrix register and configured to multiply the weight input of the weight matrix register with a vector data input in order to obtain a multiplication result. Each weight shift register is connected to only one chain and each cell is connected to only one weight shift register.

The weight values may be sent up the two chains of weight shift registers from a vector register containing pairs of weight values.

A holding register at the top of each column may hold a weight value when two weight values are unavailable from the vector register.

When two weight values are available, the two weight values are shifted on the clock cycle to the weight shift registers in the cells.

When two weight values are unavailable, on a first clock cycle that a first weight value is available, the holding register is loaded with the first weight value as a held value and no shifting is done. On the next clock cycle, when a second weight value is available, the second weight value and the held value are shifted, by the two shift chains. One value is shifted by each shift chain to weight shift registers connected to the shift chains.

Each shift chain may have two injection points for injecting weight values, one at the top of the column and the other at a second point in the column. A vector register may contain packed sets of four 8-bit integers each representing a separate weight value. Two of four integers may be injected at the top of the column and the other two of the four integers may be injected at the second point in the array.

The subject matter described in this specification can be implemented in particular embodiments so as to realize one or more of the following advantages. A matrix multiply unit with two chains of weight shift registers per column of the systolic array can deliver weights to the matrix multiply unit at twice the rate from a vector register as a matrix multiply unit with only one chain of weight shift registers. Additionally, a matrix multiply unit with two chains of weight shift registers per column that sends the weight values to two points in the array, i.e., the top and the halfway point of the array, can deliver weights to the matrix multiply unit at four times the rate from a vector register as a matrix multiply unit with only one chain of weight shift registers.

Additionally, or alternatively, a matrix multiply unit can have cells that each contain a non-transposed weight shift register and a transposed weight shift register. The matrix multiply unit then can use separate registers for vertical and horizontal weight shift chains resulting in the matrix multiply unit being able to load weight values at twice the rate of matrix multiply units that do not have separate registers for the two weight shift chains.

These weight shift loading methods can be combined to obtain eight times the increase in load time from a matrix multiply unit without two chains of weight shift registers per column and separate registers for vertical and horizontal weight shift chains. These weight shift chains and/or separate registers can be added to a matrix multiply unit without significantly increasing the complexity or the footprint of the matrix multiply unit.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be trained and then used to compute inferences. For example, the neural network has parameters that are each initialized with a value. During training, the neural network performs a neural network training procedure to adjust the values of the parameters of the neural network, e.g., to determine trained values of parameters from initial values of the parameters using backpropagation. The trained neural network can then compute inferences, i.e., process input through the layers of the neural network to generate a neural network output for the input.

For example, given an input, the neural network can compute an inference for the input. The neural network computes this inference by processing the input through each of the layers of the neural network. In some implementations, the layers of the neural network are arranged in a sequence.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph. That is, any particular layer can receive multiple inputs, multiple outputs, or both. The layers of the neural network can also be arranged so that an output of a layer can be sent back as an input to a previous layer.

Figure 1A:
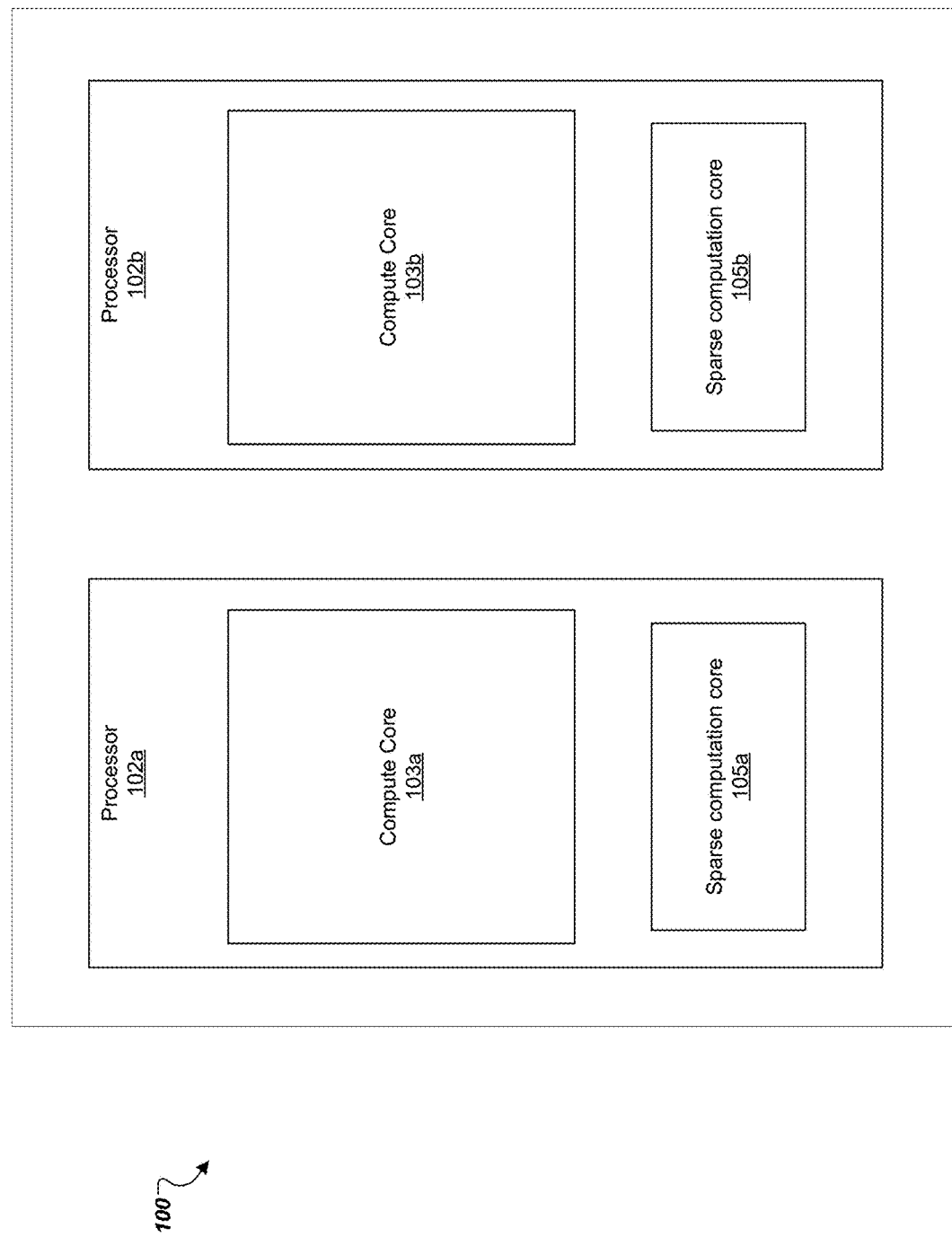
FIG. 1A shows a high-level diagram of an example special-purpose hardware chip for training a neural network.

FIG. 1A shows a high-level diagram of an example special-purpose hardware chip for training a neural network. As illustrated, a single special-purpose hardware chip includes two independent processors, e.g., 102a, 102b. Each processor 102a, 102b contains two distinct cores: (1) a compute core, i.e., a very long instruction word (VLIW) machine, (103a, 103b) and (2) a sparse computation core, i.e., an embedding layer accelerator, (105a, 105b).

Each compute core, e.g., 103a and 103b, is optimized for dense linear algebra problems. Each compute core is controlled by a single, very long instruction word. Each compute core executes its own stream of very long instruction word instructions.

An example sparse computation core, e.g., 105a or 105b, maps very sparse, high-dimensional data into dense, low-dimensional data so that the rest of the layers process densely packed input data. For example, the sparse computation core can perform the computation of any embedding layers in the neural network being trained.

To perform this sparse-to-dense mapping, the sparse computation core uses a pre-built lookup table, an embedding table. For example, when there is a series of query words as user input, each query word is converted into a hash identifier or a one-hot encoded vector. Using the identifier as a table index, the embedding table returns the corresponding dense vector, which can be an input activation vector to the next layer. The sparse computation core can also perform reduction operations across the search query words to create one dense activation vector. The sparse computation cores work together to perform efficient sparse, distributed lookups since the embedding table can be huge and not fit in the limited capacity high bandwidth memory of one of the special-purpose hardware chips. More details about the sparse computation core functionality can be found in U.S. patent application Ser. No. 15/016,486, entitled MATRIX PROCESSING APPARATUS, which was filed on Feb. 5, 2016.

Figure 1B:
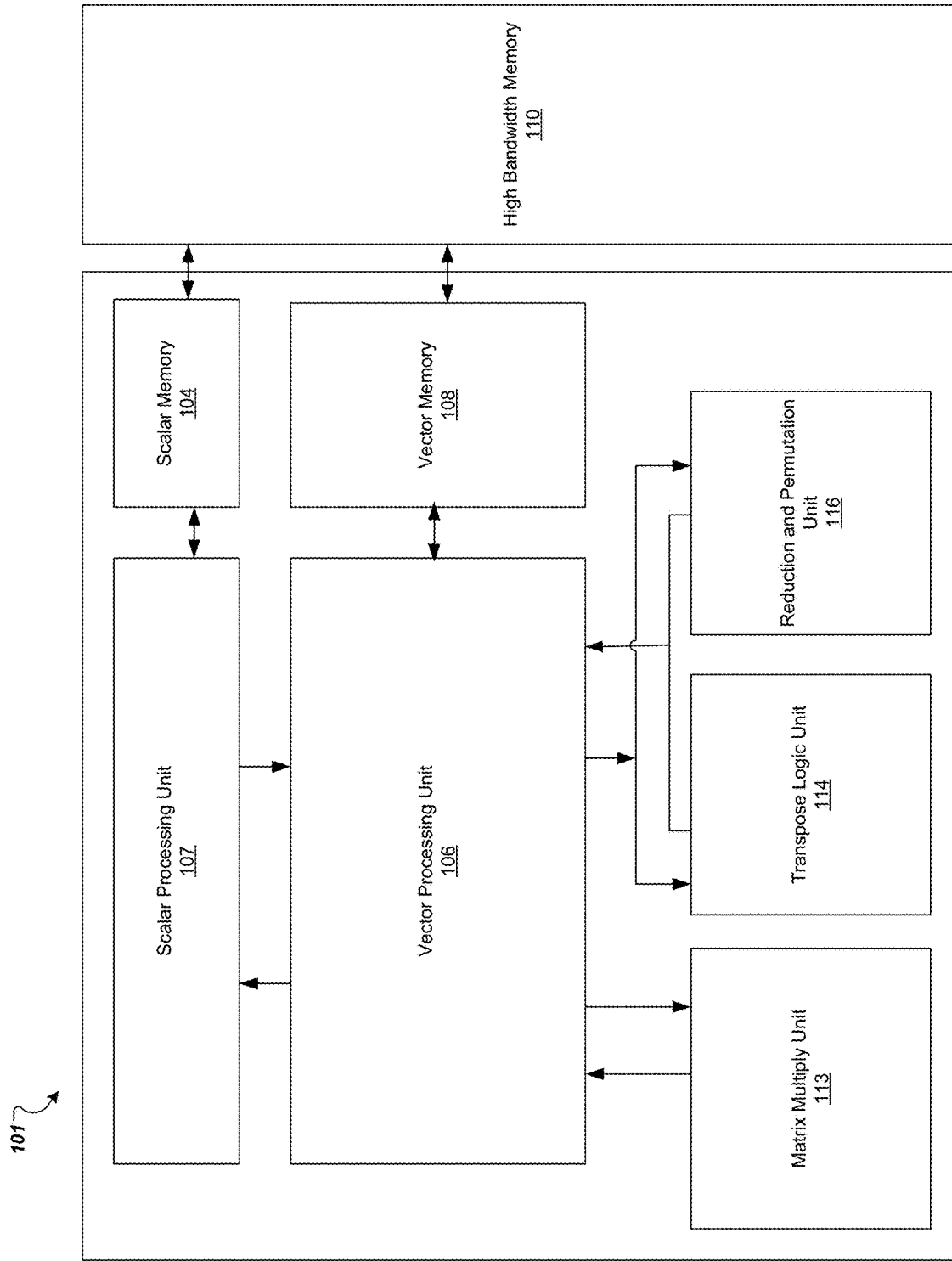
FIG. 1B shows a high-level example of compute core.

FIG. 1B shows a high-level example of compute core (101). The compute core can be a machine, i.e., a VLIW machine, that controls several compute units in parallel Each compute core (101) contains: a scalar memory (104), a vector memory (108), a scalar processing unit (107), vector registers (106), and extended vector units (i.e., a matrix multiply unit (MXU) (113) a transpose unit (XU) (114), and a reduction and permutation unit (RPU) (116)).

An example scalar processor performs VLIW instruction fetch/execute loop and controls the compute core. After fetching and decoding an instruction bundle, the scalar processor itself only executes the instructions found in the scalar slots of the bundle using multiple, multi-bit registers, i.e., 32 32-bit registers of the scalar processor (107) and scalar memory (104). The scalar instruction set includes normal arithmetic operations, e.g., as used in address calculations, load/store instructions, and branch instructions. The remaining instruction slots encode instructions for the vector processing unit or other extended vector units (113, 114, 116). The decoded vector instructions are forwarded to the vector processing unit.

Along with vector instructions, the scalar processor (107) can forward values of up to three scalar registers to the other processor and units to perform operations. The scalar processor can also directly retrieve computation results from the vector processor. However, in some implementations, the example chip has a low-bandwidth communication path from the vector processor to the scalar processor.

A vector instruction dispatcher sits between the scalar processor and the vector processor. This dispatcher receives decoded instructions from the non-scalar VLIW slots and broadcasts those instructions to the vector processing unit. The vector processing unit is described in detail with respect to FIG. 1C.

An example scalar processor (107) accesses a small, fast, private scalar memory (104), which is backed up by a much larger, but slower High Bandwidth memory (HBM) (110). Similarly, an example vector processing unit accesses a small, fast, private vector memory (108), which is also backed up by the HBM (110). Word-granularity access occurs between either the scalar processor (107) and the scalar memory (104) or the vector processing unit and the vector memory (108). The granularity of loads and stores between the vector processor and the vector memory is a vector of 128 32-bit words. Direct memory access occurs between the scalar memory (104) and the HBM (110) and the vector memory (108) and the HBM (110). In some implementations, memory transfers from the HBM (110) to the processing units (107) may only be done through the scalar or vector memories. Additionally, there may be no direct memory transfers between the scalar memory and the vector memory.

Instructions may specify extended vector unit operations. Along with each executed vector unit instruction, there are two-dimensional, i.e., 128 by 8, vector units that each can send one register value to the extended vector units as input operands. Each extended vector unit takes the input operands, performs corresponding operations, and returns the results back to the vector processor (306). The extended vector units will be described below with respect to FIG. 4.

Figure 1C:
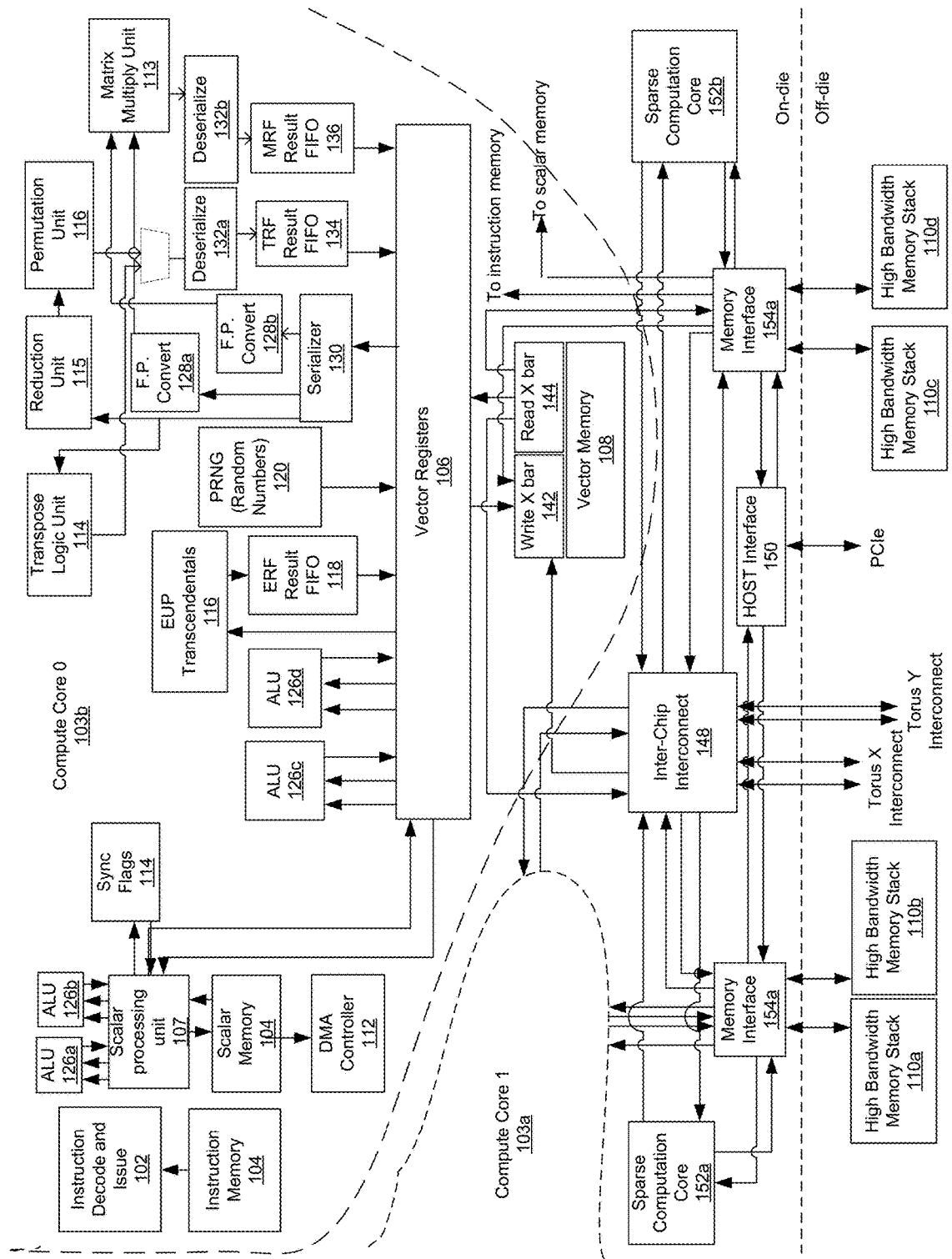
FIG. 1C shows an example neural network processing system.

FIG. 1C shows an example special-purpose integrated circuit 100 for performing neural network computations. As illustrated, the chip contains two compute cores (103a, 103b) and two sparse computation cores (152a, 152b).

The chip has a shared area which includes a host interface to a host computer (150), four stacks of high bandwidth memory along the bottom (156a-156d), and an inter-chip interconnect (148) connecting the interfaces and memory together, as well as data from other chips. Two stacks of high bandwidth memory (156a-b, 156c-d) are associated with each compute core (103a, 103b).

The chip stores data in high bandwidth memory (156c-d), reads the data in and out of vector memory (108), and processes the data. The compute core (103b) itself includes a vector memory (108) that is on-chip S-RAM which is divided into two dimensions. The vector memory has address space in which addresses hold floating point numbers, i.e., 128 numbers that are each 32-bits. The compute core (103b) also includes a computational unit that computes values and a scalar unit that controls the computational unit.

The vector processing unit consists of a 2-dimensional array of vector processing units, i.e., 128×8, which all execute the same instruction in a single instruction, multiple-data (SIMD) manner. The vector processor has lanes and sublanes, i.e., 128 lanes and 8 sublanes. Within the lane, the vector units communicate with each other through load and store instructions. Each vector unit can access one 4-byte value at a time. Vector units that do not belong to the same lane cannot communicate directly. These vector units must use the reduction/permutation unit which is described below.

The computational unit includes vector registers, i.e., 32 vector registers, in a vector processing unit (106) that can be used for both floating point operations and integer operations. The computational unit includes two arithmetic logic units (ALUs) (126c-d) to perform computations. One ALU (126c) performs floating point addition and the other ALU (126d) performs floating point multiplication. Both ALUs (126c-d) can perform various other operations such as shifts, masks, and compares. For example, a compute core (103b) may want to add a vector register, $V_1$, and a second vector register, $V_2$, and put the results in a third vector register, $V_3$. In order to compute the addition, the compute core (103b) performs multiple, i.e., 1024, operations in one clock cycle. Using these registers as operands, each of the vector units can simultaneously execute two ALU instructions, one load and one store instruction, every clock cycle. A base address for a load or a store instruction can be computed in the scalar processor and forwarded to the vector processor. Each of the vector units in each sublane can compute its own offset address using various methods such as striding and a special indexed address register.

The computational unit also contains an extended unary pipeline (EUP) (116) that performs operations such as square root and reciprocal. The compute core (103b) takes three clock cycles to perform these operations since they take in one operand at a time. Since the EUP processing takes more than one clock cycle, there is a first-in-first-out data storage to store results When an operation is finished, the results are stored in the FIFO. The compute core can use a separate instruction at a later time to pull the data out of the FIFO and put it in the vector register. A random number generator (120) allows the compute core (103b) to generate random numbers per cycle, i.e., 128 random numbers per cycle.

As described above, each processor has three extended vector units: a matrix multiply unit (113) which performs matrix multiplication operations; a cross-lane unit (XLU) that includes a transpose unit (XU) (114) which performs a transposition operation of a matrix, i.e., 128 by 128 matrix, and a reduction and permutation unit, illustrated as separate units in FIG. 1C, reduction unit 115 and permutation unit 116.

The matrix multiply unit performs matrix multiplications between two matrices. The matrix multiply unit (113) takes in data since the compute core needs to load in a set of numbers which is the matrix that is going to be multiplied. As illustrated, data comes from the vector registers (106). Each vector register contains a number, i.e., a 32-bit number. However, floating point conversion may occur as data is sent to the matrix multiply unit (113) to change the numbers to a smaller bit size, i.e., from 32-bit to 16-bit. A serializer (130) ensures when numbers are read out of the vector registers, a two-dimensional array, i.e., a 128 by 8 matrix, is read as sets of 128 numbers that are sent to the matrix multiply unit (113) for each of the next eight clock cycles. After the matrix multiply has completed its computations, the results are deserialized (132*a,b*) which means that result matrix is held for a number of clock cycles. For example, for a 128×8 array, 128 numbers are held for each of 8 clock cycles and then pushed to an appropriate FIFO, e.g., the Transpose Result FIFO (TRF) 134 or the multiply result FIFO (MRF) 136 so that a two-dimensional array of 128×8 numbers can be grabbed in one clock cycle and stored in the vector registers contained in the vector processing unit (106).

Over a period of cycles, i.e., 128 cycles, weights are shifted into the matrix multiply unit (113) as the numbers by which to multiply the matrix. Once the matrix and weights have been loaded, the compute core (103*b*) can send sets of numbers, i.e., 128×8 numbers, to the matrix multiply unit (113). Each line of the set can be multiplied by the matrix to produce a number of results, i.e., 128, results per clock cycle. While the compute core is performing matrix multiplies, the compute core also shifts new sets of numbers in the background to be the next matrix by which the compute core will multiple so that the next matrix is available when the computational process for the previous matrix has completed. The matrix multiply unit (113) can process weight inputs, which is the data in a matrix that is to be multiplied, and left-hand side data inputs, which is data in a vector that is to be multiplied by the matrix, and provide a vector of outputs to the vector processing unit. The vector processing unit can process the vector of outputs and store a vector of processed outputs to the vector memory. For example, the vector processing unit can apply a non-linear function to outputs of the matrix multiply unit to generate vector data values. In some implementations, the vector processing unit 106 generates normalized values, pooled values, or both. The vector of processed outputs can be used as left-hand side data inputs to the matrix multiply unit 113, e.g., for use in a subsequent layer in the neural network.

The transpose unit transposes a matrix. The transpose logic unit (114) takes in numbers and transposes them so that the number across a lane is transposed with the number in the other dimension. In some implementations, the vector processor includes 128×8 vector units. Therefore, to transpose a 128×128 matrix, sixteen individual transpose instructions are needed for the full matrix transpose. Once the transposition is finished, the transposed matrix will be available. However, an explicit instruction is needed to move the transposed matrix into the vector register file.

The reduction/permutation unit (or units 115, 116) addresses the problem of cross-lane communication by supporting various operations such as permutation, lane rotation, rotating permutation, lane reduction, permuted lane reduction, and segmented permuted lane reduction. As illustrated, these computations are separate, however, a compute core can use one or the other or one chained to the other. The reduction unit (115) reduces each line of numbers and feeds the numbers into the permutation unit (116). The permutation unit alters data between different lanes. The transpose unit, the reduction unit, the permutation unit, and the matrix multiply unit each take more than one clock cycle to complete. Therefore, each unit has a FIFO associated with it so that the results of computations can be pushed to the FIFO and a separate instruction can be executed at a later time to pull the data out of the FIFO and into a vector register. By using FIFOs, the compute core does not require multiple vector registers to be reserved for the duration of lengthy operations. As illustrated, each of the units takes data from the vector registers in the vector processing unit (106).

The compute core uses a scalar unit to control the computational unit. The scalar unit has two primary functions: (1) performing loop counting and addressing and (2) generating direct memory address (DMA) requests so that the DMA controller moves data in the background between the high bandwidth memory (156*c-d*) and vector memory (108) and then to the inter-chip connect (148) to other chips in an example system. The scalar unit contains an instruction memory (104), an instruction decode and issue (102), scalar processing unit (107) that contains scalar registers, i.e., 32-bit, a scalar memory (104), and two ALUs (126*a,b*) for performing two operations per clock cycle. The scalar unit can feed operands and immediate values into the vector operations. Each instruction can be sent from the instruction decode and issue (102) as an instruction bundle that contains the instructions that execute on the vector registers in the vector processing unit (106). Each instruction bundle is a very long instruction word (VLIW) with each instruction being a number of bits wide, divided into a number of instruction fields.

Figure 2:
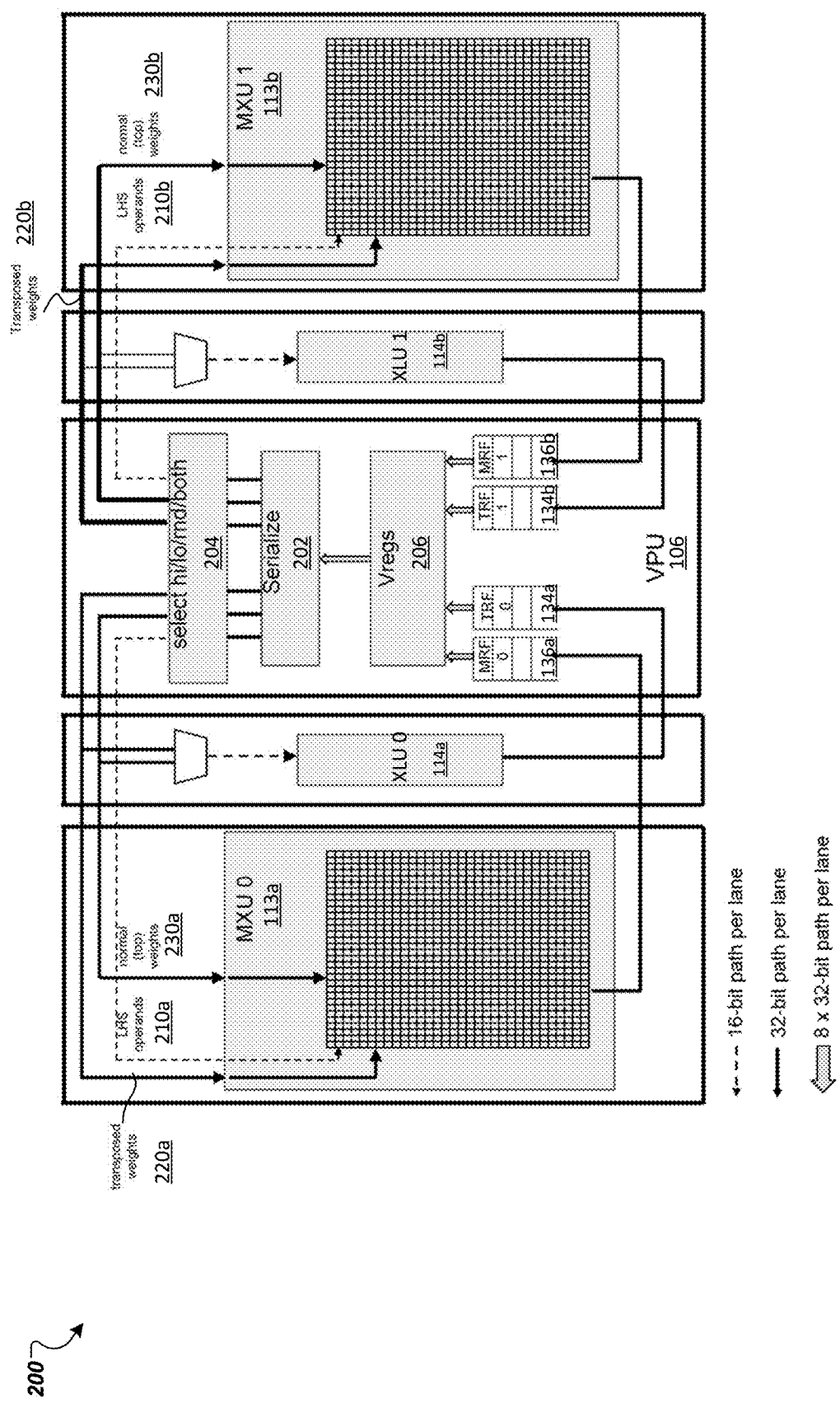
FIG. 2 illustrates an example core architecture that includes matrix multiply units. Each matrix multiply unit is a two-dimensional systolic array.

FIG. 2 illustrates an example core architecture 200 that includes matrix multiply units (MXUs) 201*a* and 201*b*. Each MXU is a two-dimensional systolic array. The array is wired to perform matrix multiply operations. An MXU multiplies a 128-element vector by a pre-loaded 128×128 matrix, with a constant throughput of one multiplication per clock cycle.

Each MXU may have 128 rows and 128 columns. An MXU can be divided into identical blocks, referred to as tiles. For example, an MXU can be divided into 32 tiles, each of which contain 32 rows by 16 columns. Each tile can further be divided into multiply-add sub unit cells. Each cell takes a vector data input operand, multiplies the operand by stored weights to obtain a result, and adds the result to a partial sum to produce a new partial sum. In some implementations, the sub-unit cells can be grouped into larger multi-cells, i.e., 2×2 arrays of multiply-add sub-unit cells or 4×4 arrays of multiply-add sub-unit cells, referred to as sedecim cells. Instead of moving input data from one multiply-add sub-unit cell to the next at a rate of one per clock cycle, the data can move across the systolic array at one multi-cell per clock cycle.

Before beginning a series of vector-matrix multiplies, a matrix needs to be pre-loaded into the MXU. The data for this matrix is called the "weights" data. The weights matrix is delivered to the MXU over source buses by the buses connected to the MXU and shifted into weight shift registers. The contents of the weight shift registers are then loaded into a weight matrix register so that the matrix multiplication can begin. This weight-loading process is described in greater detail with respect to FIGS. 3-8.

As illustrated in FIG. 2, each MXU, e.g., 113a and 113b, is connected to three buses, a first source bus for non-transposed weights (230a, 230b), a second source bus for transposed weights (220a, 220b), and a left-hand side bus (210a, 210b) for vector data to be multiplied by the matrix stored in the MXU. The MXUs are connected to the buses by wires that attach to the edges of the MXU. Each transpose unit (XU), e.g., 114a and 114b, is also connected to the first source bus and the second source bus.

The first and second source buses are multi-purpose buses that contain data sent from the vector processing unit to be consumed by either the XU or MXU. Data processing occurs in the vector processing data path, which includes vector registers 206, a serialize processing unit 202, and a selection unit 204. There are several ways that the vector processing unit can send weights on a bus. The weights may be sent normal, "hi", or "low." Eight 32-bit floating point numbers per lane (one per sublane) are rounded to bfloats, 16-bit floating point numbers. These values are packed into four pairs and sent to the MXU every other cycle over the course of 8 cycles. The difference between normal, "hi," and "low" is how the vector processing unit does the floating point 32-to-bfloat conversion. The weights may be packed meaning that each of the eight 32-bit values per lane contains a packed pair of bfloats. Sixteen values, rather than eight, values are sent to the MXU, using the source bus every cycle for eight consecutive cycles. During the odd cycles, the low 16-bits of each sublane are sent to the MXU, and during the even cycles the high 16-bits of each sublane are sent. The weights may additionally or alternatively be sent by byte. Each 32-bit operand contains a packed set of four 8-bit signed 2's complement integers. Each byte is converted to a modified sign-magnitude value. These values are sent to the MXU by a source bus over eight consecutive cycles.

The weights may be sent as non-transposed or transposed instructions using the first or second source buses and shifted into weight shift registers. When triggered with a load operation, the contents of the weight shift registers are loaded into weight matrix registers as described below. The load path from the weight shift registers to the weight matrix registers is also where conversion from modified sign-magnitude to bfloat is done with byte-mode data. A load control bus indicates whether this conversion is to be done.

Depending on the instruction being executed, the 32-bit values from the source buses may contain a packed pair of 16-bit floating point values with the values in bits [15:0] representing the earlier (in time) value, or a packed set of four 8-bit integers in modified sign-magnitude format with the value in bits [7:0] representing the earliest (in time) value and the other values following sequentially. When the MXU receives data from the buses, the data values are spread evenly across the MXU with the value 0 at the left side and the value 127 at the right side.

The left-hand side (LHS) data bus delivers 128 16-bit floating point numbers in a specific format, e.g., bfloat, to be multiplied by the matrix stored in the connected MXU. The data of the LHS data bus comes from the vector processing unit and passes through the transpose unit, e.g., 114a and 114b. When the LHS input arrives at the MXU, the values are spread evenly across the MXU with value 0 at the left side and value 127 at the right side.

The result of the matrix multiply is spread evenly across the MXU and sent from the MXU to the matrix result FIFO (MRF), e.g., 136a and 136b. Results from the XUs are sent to the corresponding transpose result FIFO (TRF), e.g., 134a and 134b.

Figure 3:
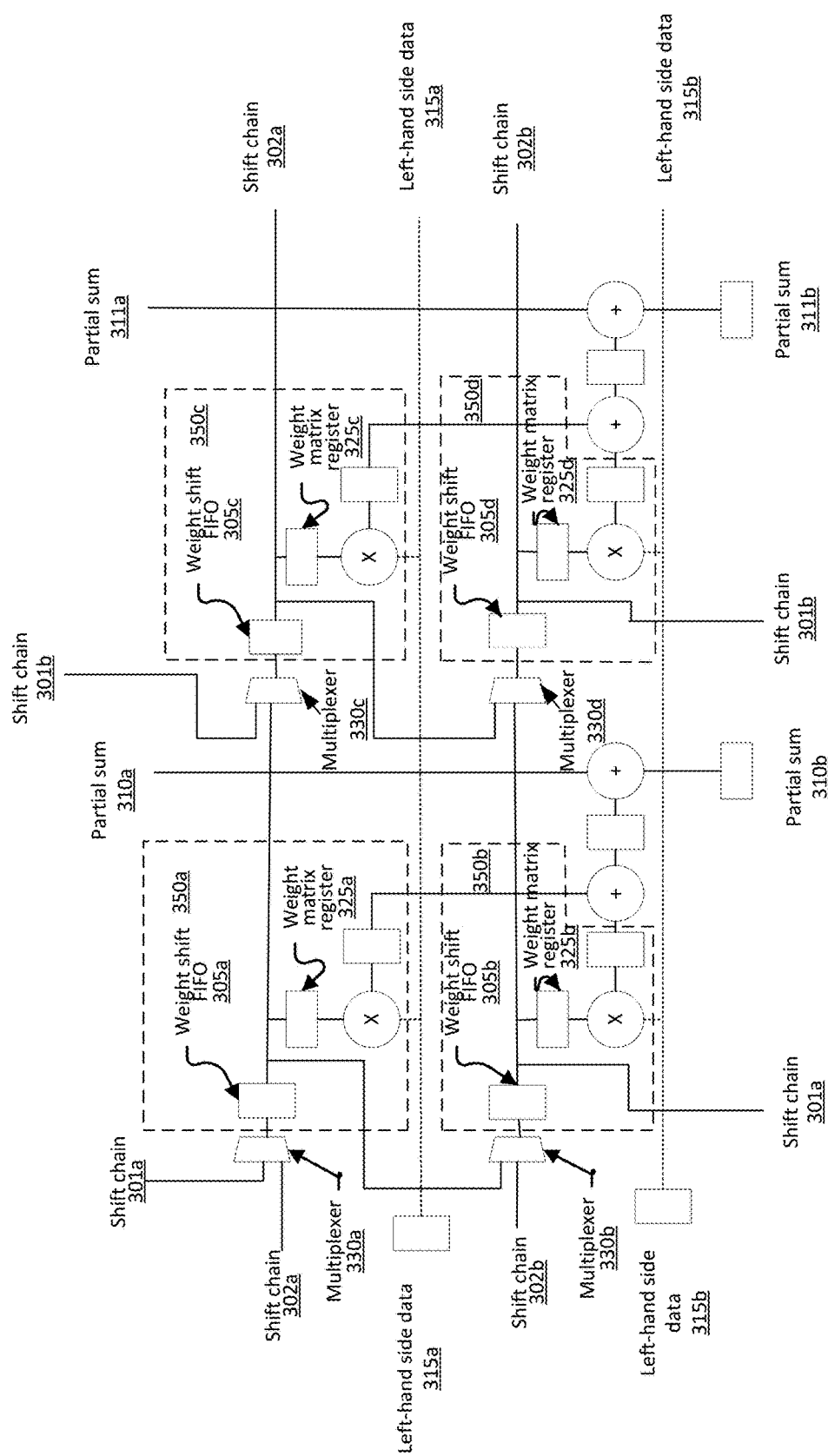
FIG. 3 illustrates an example architecture of a multi-cell inside a systolic array.

FIG. 3 illustrates an example architecture of a multi-cell inside a matrix multiply unit. As discussed above, the matrix multiply unit is a two-dimensional systolic array. The array includes multiple multiply-add sub-units that can be grouped into multi-cells. In some implementations, a first dimension of the systolic array corresponds to columns of cells and a second dimension of the systolic array corresponds to rows of cells. The systolic array can have more rows than columns, more columns than rows, or an equal number of columns and rows. This specification describes certain processing for columns or vertically. However, different designs can perform the processing for rows or horizontally.

In the illustrated example, left-hand side data registers 315a, 315b send vector data inputs to rows of the array. Weight shift chains 301a and 301b send weight input values to columns of the array, and weight shift chains 302a and 302b send weight input values to rows of the array. A shift chain is a wired pathway along which values can be passed, e.g., from a memory and to each of various registers within the matrix multiply unit.

Each weight shift register 305 is designed to shift its weight content values from a source bus along the chain of weight shift registers 305. After the data is shifted in, a parallel copy operation ensures that all the data is copied from the weight shift registers 305 to the corresponding weight matrix registers 325. When the data is in the weight matrix registers 325, the data is used in any number of cycles of multiplications. During this time, more weights may be (and typically are) shifted into the weight registers 305 in the background in preparation for the next set of multiplications.

The left-hand side data registers 315a, 315b can receive the vector data inputs. Each left-hand side data register holds one LHS data item each clock cycle for one clock cycle. Each vector data input received by a multi-cell may be free-flowing in a corresponding left-hand side register of the multi-cell, such as the left-hand side data registers 315a, 315b. The left-hand side data registers store vector data inputs which may be provided by a vector register or by an adjacent multi-cell located to the left of the given multi-cell, depending on the position of the multi-cell within the array. For instance, if the multi-cell 300 is located at the left most position within the systolic array of the matrix multiply unit, the vector data inputs are provided by a vector register. The vector register may provide multiple different vector data inputs to the multi-cell 300, in which each received vector data input then may be stored by a different one of the left-hand side data registers 315. Each row receives one value each clock cycle, regardless of the number of rows that are grouped into a multi-cell.

Each left-hand side register may be coupled to cells along a first dimension of the array of multi-cells. The connection of the left-hand side registers to the cells is indicated by dotted lines in FIG. 3. For example, left-hand side data register 315a (a left-hand side data register) in the multi-cell is coupled to the cells 350a and 350c of the first row. Similarly, left-hand side data register 315b (a second left-hand side register) in the multi-cell is coupled to the cells 350b and 350d of the second row. Each left-hand side register 315 transfers the stored vector data input to the cells 350 to which the left-hand side register is coupled. Thus, for a given number of cells extending along a first dimension (e.g., along a given row or along a given column), the vector data inputs can be passed to all cells in the multi-cell, and not just a single cell, thereby causing the vector data input to spread quickly throughout the array of cells, improving the efficiency of operation of the multi-cell.

The multiple vector data inputs can also be sent to an adjacent left-hand side register so that multiple vector data inputs can be used at another multi-cell of the array. This process allows vector data inputs to be shifted for use in another particular multi-cell of the array.

Each cell 350 of a multi-cell 300 contains a stored weight value. Before beginning a matrix multiply process, weights are loaded by shifting them into the cells of the systolic array. Dedicated chains and weight shift registers are provided for weight shifting so that new weights can be shifted in concurrently with the execution of previous matrix multiply processing. Weight inputs can be loaded into multi-cells in ways that lower the latency of the overall matrix multiply operational processing.

As discussed above, the weight shift chains 301, 302 can receive weight inputs from a memory unit, e.g., the vector memory 108 of FIG. 1. The shift chains can send multiple corresponding weight inputs to the weight matrix registers 325 associated with the multi-cell 300.

In some implementations, weight shift registers shift vector data inputs throughout the array along one dimension, e.g., to the right, while shifting weight input throughout the array along one or both dimensions, e.g., to the right or to the bottom. For example, over one clock cycle, each vector data input of the multiple vector data inputs at multi-cell 300 can shift to a corresponding left-hand side data register in the next multi-cell in the same row. Horizontal data (left-hand side data) and vertical data (partial sums) each move by one multi-cell per clock cycle, every clock cycle. Weights only shift when instructed by the system and, depending on the implementation and the instructions executed, may shift 1, 2, or 4 rows (or columns).

A multiplexer 330 selects a weight either from a weight shift register 305 of the first shift chain 301 or the second shift chain 302 and forwards the selected input into a single line into the weight matrix register 325. Although multiplexers 330 are shown outside of the cell 350 boundary lines, in some implementations the multiplexers 330 exist within the cells 350.

On a clock cycle, each multi-cell can process the multiple given weight inputs and the multiple given vector data inputs to generate multiple accumulated outputs. Generally, processing includes a multiplication operation to multiply a vector data input with a stored weight. The accumulated outputs can also be passed to an adjacent multi-cell down along the same dimension as the given weight inputs. In some implementations, weights are shifted more than one multi-cell during a given clock cycle to transition from one convolution calculation to another.

The accumulated outputs can be passed along the same columns as weight inputs, e.g., towards the bottom of the column in the array. In some implementations, a partial sum register 310a, 311a passes a partial sum value into the multi-cell from a previous multi-cell. The array can include partial sum registers 310b, 311b that store the accumulated outputs from each column of multi-cells. For each column of the multi-cell, the products generated by the sub-unit cells in the column are combined with the incoming partial sum from the multi-cell above and then sent on as the next partial sum. For certain multi-cells, e.g., the multi-cells in the bottom column of the systolic array, the accumulated outputs may include final accumulated values that can be transferred to a vector computation unit. In some implementations, the final accumulated values are transferred directly from the bottom multi-cells of the array to the vector computation unit while in other implementations, the final accumulated values are first stored in a memory or are processed by a different component before being sent to the vector computation unit.

Figure 4:
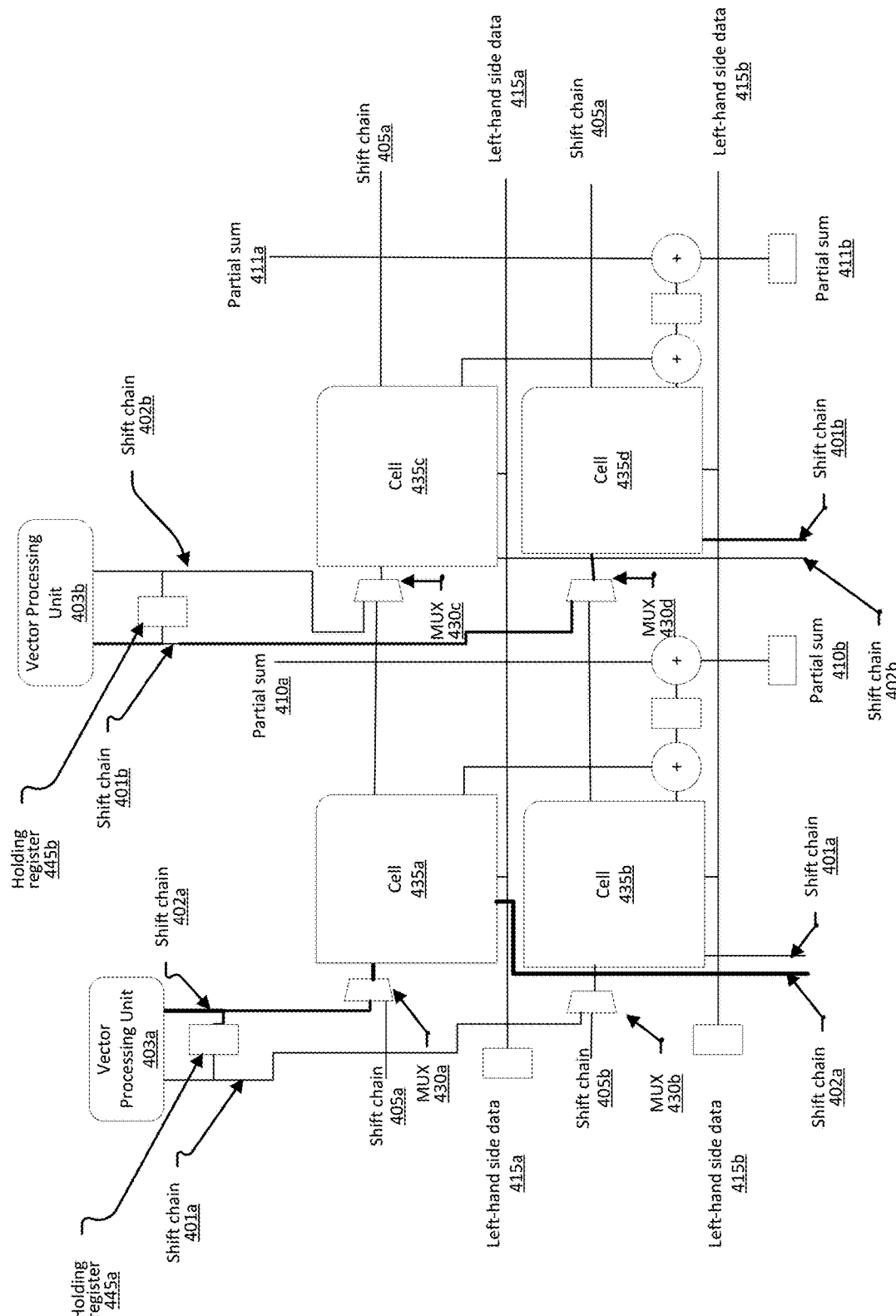
FIG. 4 shows an example of architecture of a matrix multiply unit with two chains of weight shift registers per column in order to increase the rate of loading weight values.

FIG. 4 shows an example of architecture of a multi-cell of a matrix multiply unit with two chains of weight shift registers per column of the multi-cell sub-array in order to increase the rate of loading weight values. As shown in FIG. 4, cell 435a and cell 435b make up one column of the multi-cell 400 and cell 435c and cell 435d make up a second column of the multi-cell 400. Each column has two chains of weight shift registers. Each cell in a given column is configured to receive weight inputs from only one of the two chains in the column. As shown in FIG. 4, one chain 401 connects to weight shift registers in even-numbered rows and one chain 402 connects to weight shift registers in odd-numbered rows. Each cycle, two new values are shifted into each column and all existing weight values are shifted down by two rows. Thus, weights can be loaded into a multi-cell at twice the rate of matrix multiply units that do not have two chains of weight shift registers column of the systolic array.

As illustrated, weight values are shifted in from vector registers 403. In an implementation, there is one vector register 403 per column of the matrix multiply unit. Although vector registers 403 are illustrated at the top of the matrix multiply unit in the example of FIG. 3, vector registers 403 can be physically located in various positions relative to the matrix multiply unit, e.g., at the bottom of the unit.

A vector register 403 can hold register values that are some magnitude greater or smaller than the values operated on by the matrix multiply unit. For example, a register may hold n-bit values while the matrix multiply unit operates on n/2-bit values. In some implementation, each vector register holds 32-bit values and the matrix multiply unit operates on 16-bit values. An example matrix multiply unit has a mode to treat each 32-bit value of the register as a pair of 16-bit values, where one 16-bit value of the pair is sent to the first weight shift chain 401 and the second 16-bit value of the pair is sent to the second weight shift chain 402. Although one vector register 403 is shown per column, there may be only one vector register 403 per multi-cell. Additionally or alternatively, each chain may be connected to a separate vector register 303 that provides a single 16-bit weight value to the chain. In this case, the 32-bit floating point values in the vector register 403 are converted to 16-bit values.

In some implementations, weight values may not be available to send the values at twice the rate of a matrix multiply unit without two shift chains per column. In order to handle this situation, a holding register 445 is placed at the top of each column to hold a weight value until two weight values are available, one for each vertical shift chain. On the first clock cycle that only one weight value is available, the available weight value is copied into the holding register 445. On the next clock cycle that a new weight value is available, the weight value in the holding register will be shifted from the holding register to a weight shift register by one weight shift chain and the new weight value available on the clock cycle will be shifted to a second weight shift register by the second weight shift chain.

A horizontal shift chain 405 may provide weight values to the cells as described above. In some implementations, there may be two horizontal shift chains that function to decrease the weight load latency the same way as the vertical shift chains 401, 402 described above.

A multiplexer 430 determines whether a weight value sent to a weight matrix register within a cell comes from the horizontal shift chain 405 or the vertical shift chain 401*b* or 402*b*. Once a weight value has been loaded into the weight matrix register and the left-hand side data register 415 provides vector data input, a matrix multiply can then be performed by the cell 435.

Figure 5:
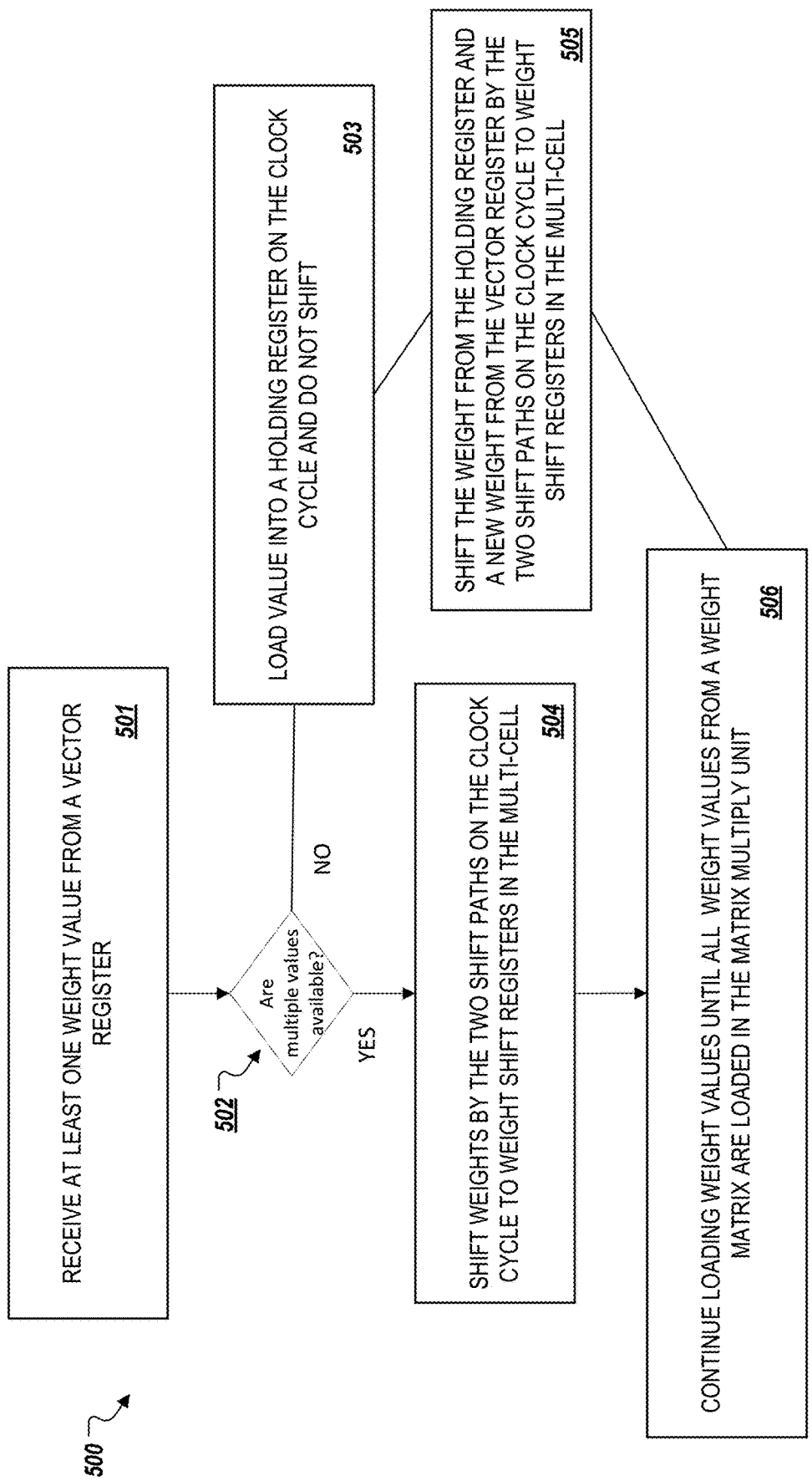
FIG. 5 is a flow diagram of an example method for loading weight values into a column of a given multi-cell.

FIG. 5 is a flow diagram of an example process 500 for loading weight values into a column of a given multi-cell. The interface receives at least one weight value from a vector register 501.

The interface determines whether multiple weight values are available 502.

If multiple weight values are available, the interface shifts weight values by the shift chains on the clock cycle to the weight shift registers in the cells 435 within the multi-cell 504.

The interface continues loading weight values until all weight values from a weight matrix are loaded in the matrix multiply unit 506.

If two weight values are not available at the same clock cycle, on the first cycle that a single weight value is available, the holding register 445 are loaded with the available weight value and no shifting is done 503.

On the next cycle when another weight value becomes available, the interface shifts the new value and the value held in the holding register 445 by the two shift chains to weight shift registers in the multi-cell 505.

Then, the interface continues loading weight values until all weight values from a weight matrix are loaded in the matrix multiply unit 506.

In the case where multiple weight values are not available per cycle, the interface only activates the shift chains every other cycle.

Figure 6:
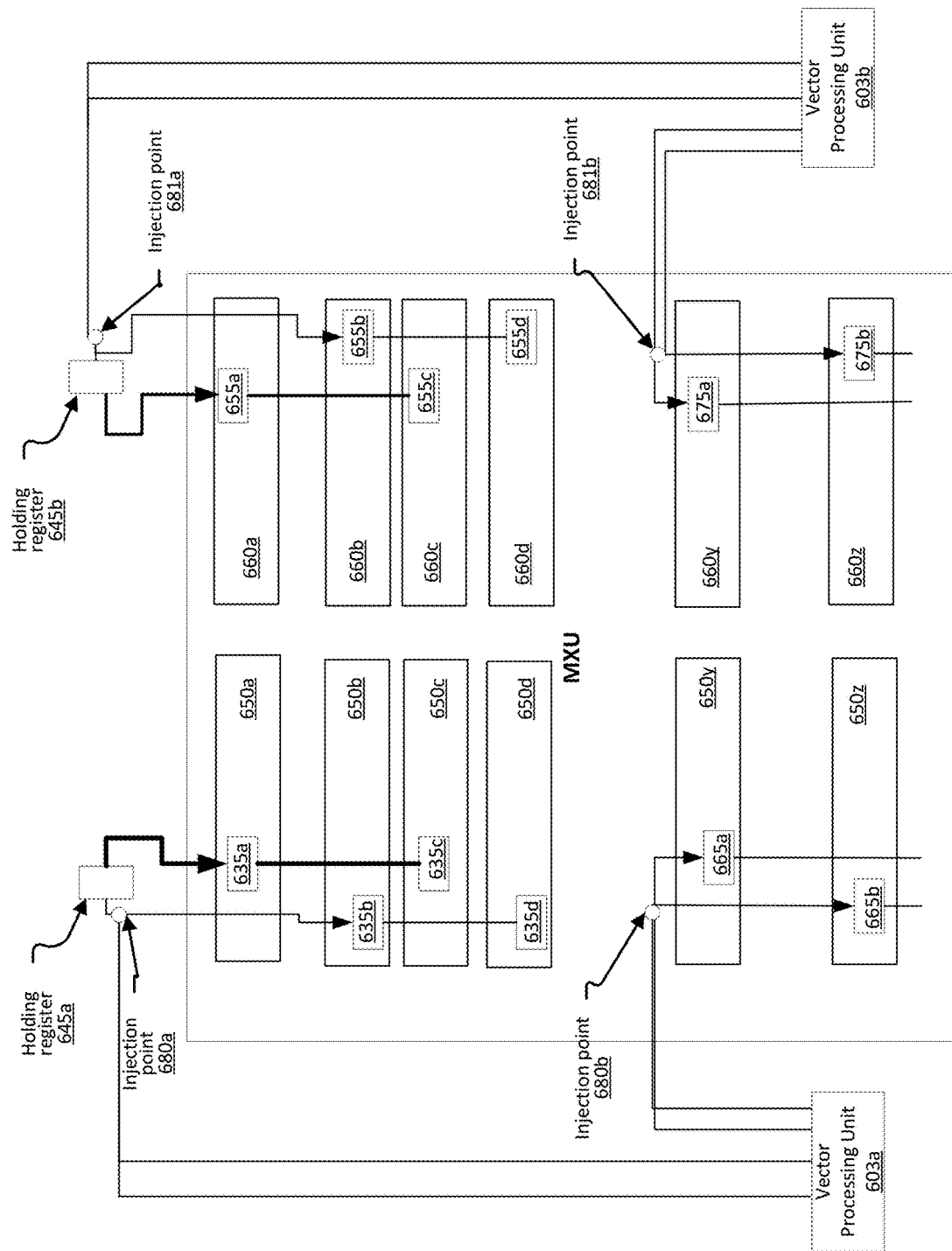
FIG. 6 shows an example of architecture of a matrix multiply unit with two chains of weight shift registers per column that sends weight values at two points in the column to increase the rate of loading weight values.

FIG. 6 shows an example of architecture of a matrix multiply unit with two chains of weight shift registers per column that injects weight values at two points in the column in order to increase the rate of loading weight values by four times. As shown in FIG. 3, a matrix multiply unit has two shift chains per column of the systolic array. Each cell 650 contains a shift register 635 that is connected to only one shift chain. As discussed above, a vector register 603 can hold register values that are some magnitude greater or smaller than the values operated on by the matrix multiply unit. For example, a register may hold n-bit values while the matrix multiply unit operates on n/2-bit values. The values in the vector register can be split or in some way transformed to match the value size expected by the matrix multiply unit.

In one implementation, each register 603 can hold 32-bit values. The values in each vector register 603 are treated as a packed set of four 8-bit signed integers, each a separate weight value. Each 8-bit signed integer is sent on two 16-bit chains as illustrated in FIG. 3. However, the integers are sent to two injection points 680, 681 per column in the systolic array. The integers are sent to the top (680*a*, 6801*a*) and another point down the array (680*b*, 680*b*). The embodiment with multiple injection points as described may be combined with other embodiments and features discussed herein.

In some implementations, if the integers are sent to a point halfway down the array, no extra wiring is required to inject integers since the chains from the vector registers to the top of the array traverse over the length of the array from the bottom to top. At the top of each column, two of the integers are converted to 16-bit floating point values of the format used by the array, which are then injected into the two weight shift chains (680*a*, 681*a*) as described above. The shift chains are cut at the halfway point by a multiplexer, and a second set of integer to-float converters at that point take the other two integers from each 32-bit value, convert them, and inject them at that point (680*b*, 681*b*). For example, a 32-bit word can be divided into four equal parts of 8-bits: A, B, C, and D. A weight interface can send parts A and B to the top of the array and convert them to 16-bit values to be operated on by the matrix multiply unit. The weight interface can also send parts C and D to the halfway point of the array via a multiplexer. In this implementation, parts C and D are not sent to the top of the array, but are injected into weight shift registers of cells at the halfway point on the shift chains. A multiplexer exists on the shift chains at the halfway point so that weight values are chosen from the injection point and not from the previous weight shift register on the shift chain.

It is possible that the point of injecting the second pair of weights into the array is not the halfway point, but some other point. For example, it could be a point one-fourth of the way down the array. In this case, weights injected at the top are shifted to the first one-fourth cells of the matrix multiply unit, and the third one-fourth cells of the matrix multiply unit while the weights injected at the one-fourth point are shifted to the second and fourth one-fourth cells of the matrix multiply unit. This process requires additional wiring, but allows the weights to start shifting sooner while a previous matrix multiply is finishing.

As shown, the two shifting chains occur per column. However, in some implementations, the two shifting chains can occur additionally or alternatively per row with two injection points per shifting chain.

Figure 7:
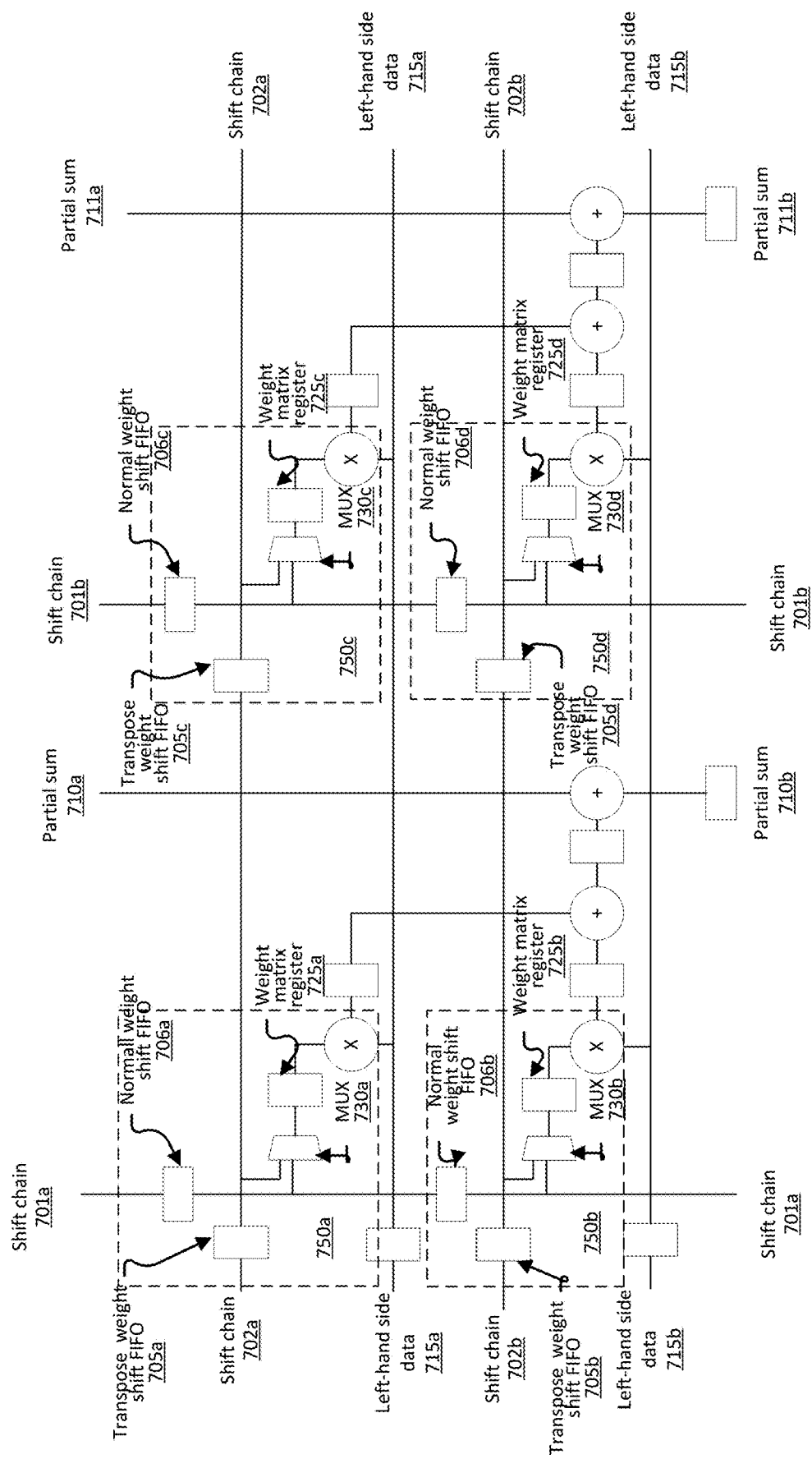
FIG. 7 shows an example of architecture of a matrix multiply unit with separate registers for horizontal weight shifting and vertical weight shifting to increase the rate of loading weight values.

FIG. 7 shows an example of architecture of a matrix multiply unit with separate registers for transposed weight shifting and normal, non-transposed weight shifting to increase the rate of loading weight values. Each multi-cell 700 include multiple cells 750 and may be loaded with weight values from either a vertical or horizontal direction. Loading weights from the top in a vertical direction results in a weight matrix being stored in the matrix multiply unit. Loading the same weights in the same order but from the side results in the transpose of the weight matrix being stored in the matrix multiply unit. In neural network system training, both the non-transposed weight matrix and the transposed weight matrix must be loaded at different steps of the training algorithm. When weights are loaded in the vertical direction from the top, the weight values are shifted down through the cells. When the weights are loaded from the left in a horizontal direction, the weight values are shifted right through the multi-cell 700. FIG. 7 illustrates normal shift chains 701*a*, 701*b* connected to normal shift registers 705. Transposed shift chains 702*a*, 702*b* are connected to transposed shift registers 705. A multiplexer 730 determines from which shift chain 701, 702 to load a weight matrix register 725.

In some implementations, it takes n cycles to shift a set of weights into the weight matrix registers of a matrix multiply unit. The second set of weights can begin its shifting n/2 cycles after the first weight value is loaded, and a new set of weights may be loaded from shift registers into weight matrix registers every n/2 cycles.

In some implementations it is not always necessary to use an entire set of 128×128 weights. Weights in unused positions can be set to zero, making the weight matrix effectively smaller. A matrix multiply unit then does not need to shift data into all rows or all columns of the weight shift registers. Each weight shift instruction will shift 8 rows, or for transposed loads, 8 columns, of data into the systolic array. Sixteen weight shift instructions loads the entire 128×128 matrix replacing all previous data. Each weight shift register is cleared when data is copied from the weight shift register to the corresponding weight matrix register. Shifting new data into the weight shift registers can begin immediately after this load-and-clear signal starts to propagate. The weight shift signal is inhibited for all cells below and to the right of the load- and clear wavefront so that data does not shift before it has a chance to load. Since the old data gets entirely cleared, it is not necessary to shift in allow rows or columns of data. Only the top (or left) portion of the shift registers will be filled with new data and the rest will remain zero thus causing incoming data to those rows to be ignored (or output data from those columns to be zero).

Figure 8:
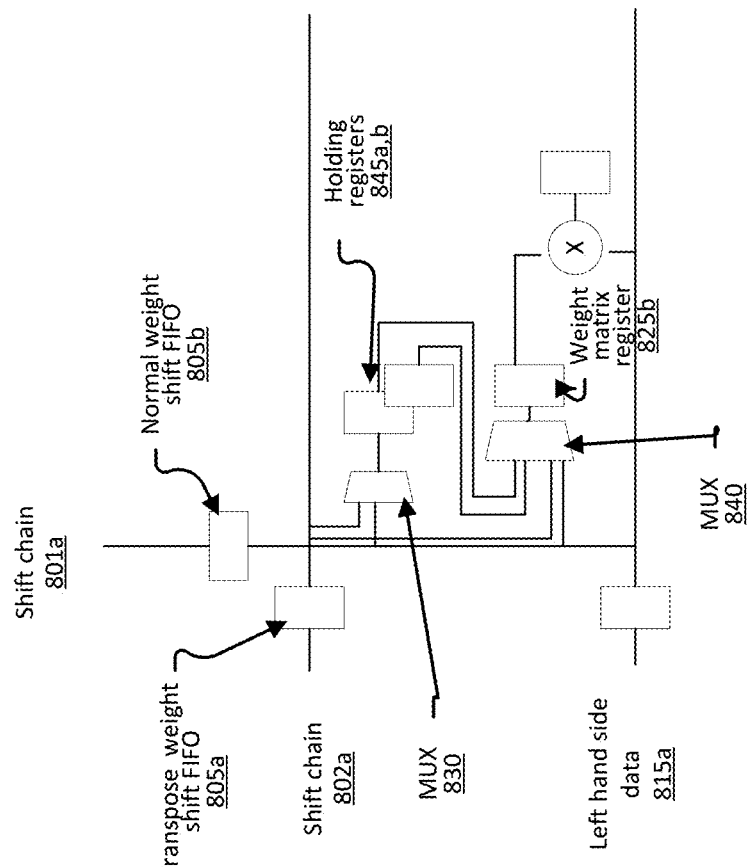
FIG. 8 shows an example cell with a set of holding registers to increase the rate of loading weight values.

FIG. 8 shows an example cell 800 with a set of holding registers to increase the rate of loading weight values. The cell 800 includes one or more set of weight holding registers which are used as temporary storage for sets of weights that have been shifted in. The values of one set of weight shift registers 805a can be copied, instead or in addition to being copied to the weight matrix registers 825, to one set of weight holding registers 845a. The values of a second set of weight shift registers 805b can be copied, instead or in addition to being copied to the weight matrix registers 825, into a second set of weight holding registers 845b. At the time a set of weight values is to be loaded into the weight matrix registers, the set of weight values may be taken from one of the sets of holding registers 845 instead of directly from the weight shift registers 805a,805b. This process allows a set of weight values to be loaded more than once after being shifted into the array. For example, if an algorithm calls for switching between two sets of weights, the weight values from one shift chain can be shifted to the holding registers between loads. This process also allows decoupling of the timing of the weight shifting from the weight loading. For example, when a new set of weight values begins shifting every n/c cycles, it is possible to shift both sets of weight values at the same time and when the first set is loaded to the weight matrix registers the other set is moved to a weight holding register. After n/2 additional cycles, the second set is loaded from the holding registers to the weight matrix registers.

In some implementations, the two shift chain of FIGS. 4 and/or 6 can be combined with the addition of normal and transposed shift registers for an increase in the amount of weight values that can be loaded at a given time into the matrix multiply unit.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment 1 is a matrix multiply unit implemented as a systolic array of cells, each cell of the array of cells comprising: a weight matrix register configured to receive a weight input from either a transposed or a non-transposed weight shift register; a transposed weight shift register configured to receive a weight input from a horizontal direction to be stored in the weight matrix register; a non-transposed weight shift register configured to receive a weight input from a vertical direction to be stored in the weight matrix register; and a multiply unit that is coupled to the weight matrix register and configured to multiply the weight input of the weight matrix register with a vector data input in order to obtain a multiplication result.

Embodiment 2 is the matrix multiply unit of embodiment 1, wherein each cell further comprises: a multiplexer configured to select between the weight input of the transposed weight shift register and non-transposed weight shift register and forward the selected weight input to the weight matrix register.

Embodiment 3 is the matrix multiply unit of embodiments 1 or 2, further comprising a first weight holding register configured to hold a weight value from either the transposed weight shift register or the non-transposed weight shift register.

Embodiment 4 is the matrix multiply unit of any one of embodiments 1-3, further comprising a second weight holding register configured to hold a weight value from either the transposed weight shift register or the non-transposed weight shift register.

Embodiment 5 is the matrix multiply unit of any one of embodiments 1-4, wherein a weight value is loaded from a transposed weight shift register into the first weight holding register and a weight value is loaded from a vertical direction into the second weight holding register.

Embodiment 6 is the matrix multiply unit of any one of embodiments 1-5, wherein the weight matrix register is loaded with a value from either the first or the second weight holding register.

Embodiment 7 is a matrix multiply unit implemented as a systolic array comprising: a plurality of cells arranged in columns of the systolic array; two chains of weight shift registers per column of the systolic array; wherein each weight shift register is connected to only one chain and each cell is connected to only one weight shift register; a weight matrix register per cell configured to store a weight input received from a weight shift register; and a multiply unit that is coupled to the weight matrix register and configured to multiply the weight input of the weight matrix register with a vector data input in order to obtain a multiplication result.

Embodiment 8 is the matrix multiply unit of embodiment 7, wherein weight values are sent up the two chains of weight shift registers from a vector register containing pairs of weight values.

Embodiment 9 is the matrix multiply unit of embodiments 7 or 8, further comprising a holding register at the top of each column to hold a weight value when two weight values are unavailable from the vector register.

Embodiment 10 is the matrix multiply unit of any one of embodiments 7-9, wherein when two weight values are available, the two weight values are shifted on the clock cycle to the weight shift registers in the cells.

Embodiment 11 is the matrix multiply unit of any one of embodiments 7-10, wherein when two weight values are unavailable: on a first clock cycle that a first weight value is available, the holding register is loaded with the first weight value as a held value and no shifting is done; and on a next clock cycle, when a second weight value is available, the second weight value and the held value are shifted, by the two shift chains, one value shifted by each shift chain, to weight shift registers connected to the shift chains.

Embodiment 12 is the matrix multiply unit of any one of embodiments 7-11, further comprising: each shift chain having two injection points for injecting weight values, one at the top of the column and the other at a second point in the column.

Embodiment 13 is the matrix multiply unit of any one of embodiments 7-12, further comprising: a vector register containing packed sets of four 8-bit integers each representing a separate weight value.

Embodiment 14 is the matrix multiply unit of any one of embodiments 7-13, further comprising: injecting two of the four integers at the top of the column and injecting the other two of the four integers to the second point in the array.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A processor comprising:
   a processing core having an array of cells;
   a first plurality of shift chains coupled to even-numbered rows or columns of the array of cells;
   a second plurality of shift chains coupled to odd-numbered rows or columns of the array of cells, wherein the processor is configured to execute instructions that cause the processor to perform operations comprising:
   concurrently loading two weight values on each cycle into each row or column using the first plurality of shift chains and the second plurality of shift chains.

2. The processor of claim 1, wherein each shift chain has at least two injection points for loading weight values.

3. The processor of claim 2, wherein a first injection point for loading weight values is at the top of a column, and wherein a second injection point for loading weight values is at a second point of a column.

4. The processor of claim 3, wherein the second injection point is a halfway point of the column or at a point one-fourth of the way down the column.

5. The processor of claim 3, wherein the second injection point is at a point one-fourth of the way down the column.

6. The processor of claim 1, further comprising:
   at least one chain of weight shift registers per column of the array corresponding to the first plurality of shift chains and per column of the array corresponding to the second plurality of shift chains.

7. The processor of claim 6, further comprising:
   a weight matrix register per cell configured to store a weight input received from a weight shift register.

8. The processor of claim 7, further comprising:
   a multiply unit that is coupled to the weight matrix register and configured to multiply the weight input of the weight matrix register with a vector data input to obtain a multiplication result.

9. The processor of claim 7, further comprising a multiplexer on the at least one chain at a second point in the column configured to select a weight value from an other injection point or a weight shift register of the at least one chain.

10. The processor of claim 7, comprising two chains of weight shift registers per column of the first plurality of shift chains and per column of the second plurality of shift chains, wherein each weight shift register is connected to only one chain, each chain having two injection points for loading weight values.

11. The processor of claim 10, further comprising:
    a vector register containing packed sets of four 8-bit integers each representing a separate weight value.

12. The processor of claim 11, wherein the operations further comprise:
    loading two of the four 8-bit integers at a top of a column and injecting the other two of the four 8-bit integers to a second point in the array.

13. The processor of claim 12, further comprising a holding register at the top of each column to hold a weight value when two weight values are unavailable from the vector register.

14. The processor of claim 13, wherein when two weight values are unavailable:
    on a first clock cycle that a first weight value is available, the holding register is loaded with the first weight value as a held value and no shifting is done; and
    on a next clock cycle, when a second weight value is available, the second weight value and the held value are shifted, by the two weight shift register chains, one value shifted by each weight shift register chain, to weight shift registers connected to the two weight shift register chains.

15. The processor of claim 13, wherein when two weight values are available, the two weight values are shifted on a clock cycle to the weight shift registers in the cells.

16. The processor of claim 7, wherein when data is in the weight matrix register, the data is used in any number of cycles of multiplications.

17. The processor of claim 16, wherein during the any number of cycles of multiplications, more weights are shifted into the weight shift registers in the background in preparation for a next set of multiplications.

18. The processor of claim 16, wherein during the any number of cycles of multiplications, a weight input of the weight matrix register is multiplied with a vector data input to obtain a multiplication result.

19. The processor of claim 2, further comprising:
    one or more additional chains of weight shift registers per row of the first plurality of shift chains and per row of the second plurality of shift chains, wherein each additional weight shift register is connected to only one additional chain of the one or more addition chains and each cell is connected to only one additional weight shift register, the additional chain having two injection points for loading weight values.

20. A method performed by a processor having a processing core with an array of cells, the method comprising:

concurrently loading two weight values on each cycle into each row or column of the array of cells using a first plurality of shift chains coupled to even-numbered rows or columns of the array of cells and a second plurality of shift chains coupled to odd-numbered rows or columns of the array of cells.

21. The method of claim 20, wherein the concurrently loading uses at least two injection points on each shift chain for loading the weight values.

22. The method of claim 21, wherein a first injection point is at a top of a column and a second injection point is at a second point in the column.

23. The method of claim 22, wherein the second point in the column is a halfway point of the column or a point one-fourth of the way down the column.

24. The method of claim 22, wherein the second point in the column is a point one-fourth of the way down the column.

25. The method of claim 20, wherein the loading is performed using at least one chain of weight shift registers for each column corresponding to the first and second pluralities of shift chains.

26. The method of claim 25, further comprising storing a received weight input in a weight matrix register within each cell of the array of cells.

27. The method of claim 26, further comprising multiplying the weight input stored in the weight matrix register with a vector data input to obtain a multiplication result.

28. The method of claim 26, further comprising selecting, at a second point in a column, a weight value from an injection point or from a weight shift register.

29. The method of claim 26, wherein the loading is performed using two chains of weight shift registers per column, wherein each weight shift register is connected to only one chain, and wherein each chain has two injection points for loading the weight values.

* * * * *